(12) United States Patent
Han

(10) Patent No.: US 10,415,480 B2
(45) Date of Patent: Sep. 17, 2019

(54) GAS TURBINE ENGINE FUEL MANIFOLD DAMPER AND METHOD OF DYNAMICS ATTENUATION

(71) Applicant: General Electric Company, Schenectady, NY (US)

(72) Inventor: Fei Han, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 314 days.

(21) Appl. No.: 15/486,872

(22) Filed: Apr. 13, 2017

(65) Prior Publication Data

US 2018/0298825 A1    Oct. 18, 2018

(51) Int. Cl.
   *F02C 7/22*      (2006.01)
   *F23R 3/28*      (2006.01)
(52) U.S. Cl.
   CPC ............. *F02C 7/222* (2013.01); *F23R 3/28*
       (2013.01); *F05D 2220/32* (2013.01); *F05D 2260/96* (2013.01); *F23R 2900/00013* (2013.01); *F23R 2900/00014* (2013.01)
(58) Field of Classification Search
   CPC . F02C 7/222; F23R 2900/00014; F01N 1/023
   See application file for complete search history.

(56) References Cited

U.S. PATENT DOCUMENTS 867,757 A    10/1907  Ruecker

| | | |
|---|---|---|
| 3,793,838 A | 2/1974 | Nash |
| 5,119,636 A | 6/1992 | Batakis et al. |
| 5,168,698 A | 12/1992 | Peterson et al. |

(Continued)

FOREIGN PATENT DOCUMENTS

| EP | 2 851 618 A1 | 3/2015 |
|---|---|---|
| GB | 2515028 A | 12/2014 |

(Continued)

OTHER PUBLICATIONS

International Search Report and Written Opinion issued in connection with corresponding PCT Application No. PCT/US2018/026718 dated Jul. 26, 2018.

(Continued)

*Primary Examiner* — Scott J Walthour
*Assistant Examiner* — Todd N Jordan
(74) *Attorney, Agent, or Firm* — Philip S. Hof; The Small Patent Law Group, LLC

(57) ABSTRACT

The present disclosure is directed to a fuel manifold assembly for a gas turbine engine. The fuel manifold assembly defines a walled conduit through which a fuel flows in a fuel passage. The walled conduit defines a first end and a second end opposite of the first end along a length of the walled conduit. The fuel manifold assembly includes an exit manifold to which a fuel nozzle attaches. The fuel manifold assembly includes a damper assembly coupled to the walled conduit of the fuel manifold assembly. The damper assembly includes a walled tube extended from the walled conduit. The damper assembly further includes a walled enclosure defining a damper cavity therein. The damper cavity is in fluid communication with a damper passage defined within the walled tube, and the damper passage is in fluid communication with the fuel passage.

15 Claims, 9 Drawing Sheets

(56) References Cited

U.S. PATENT DOCUMENTS

| | | | |
|---|---|---|---|
| 5,273,249 | A | 12/1993 | Peterson et al. |
| 5,369,952 | A | 12/1994 | Walters |
| 6,487,860 | B2 | 12/2002 | Mayersky et al. |
| 6,536,457 | B2 | 3/2003 | Dooley |
| 6,905,002 | B2 * | 6/2005 | Bagga ............... F02M 55/04 |
| | | | 123/456 |
| 7,302,802 | B2 | 12/2007 | Alkabie |
| 7,337,875 | B2 | 3/2008 | Proscia et al. |
| 7,350,357 | B2 | 4/2008 | Chen et al. |
| 7,464,552 | B2 * | 12/2008 | Sattinger ............ F02C 7/222 |
| | | | 60/725 |
| 7,533,534 | B2 | 5/2009 | Alkabie |
| 7,549,290 | B2 | 6/2009 | Holt et al. |
| 7,805,943 | B2 | 10/2010 | Desaulty et al. |
| 7,856,830 | B2 | 12/2010 | Alkabie |
| 7,857,094 | B2 | 12/2010 | Macquisten et al. |
| 7,926,278 | B2 | 4/2011 | Gerendas et al. |
| 7,874,159 | B2 | 6/2011 | Gerendas et al. |
| 8,037,688 | B2 | 10/2011 | Hagen et al. |
| 8,234,873 | B2 | 8/2012 | Houtman et al. |
| 8,701,420 | B2 | 4/2014 | Nomura et al. |
| 8,733,496 | B2 | 5/2014 | Ono et al. |
| 8,931,588 | B2 | 1/2015 | Murray |
| 2002/0083987 | A1 | 7/2002 | Dooley |
| 2011/0048021 | A1 | 3/2011 | Slobodyanskiy et al. |
| 2011/0232288 | A1 | 9/2011 | Bizouard et al. |
| 2012/0167574 | A1 | 7/2012 | Uskert |
| 2012/0240583 | A1 | 9/2012 | Penz et al. |
| 2013/0042627 | A1 | 2/2013 | Gerendas et al. |
| 2013/0283799 | A1 | 10/2013 | Carey et al. |
| 2014/0083111 | A1 | 3/2014 | Gregg et al. |
| 2014/0109591 | A1 | 4/2014 | Bothien et al. |
| 2014/0245746 | A1 | 9/2014 | Srinivasan et al. |
| 2015/0021117 | A1 | 1/2015 | Rupp et al. |
| 2015/0059345 | A1 * | 3/2015 | Hellat ............... F23R 3/002 |
| | | | 60/725 |
| 2015/0315969 | A1 | 11/2015 | Fisher et al. |
| 2016/0076772 | A1 | 3/2016 | Metternich et al. |
| 2016/0177836 | A1 | 6/2016 | Wickström et al. |
| 2017/0153027 | A1 * | 6/2017 | Yang ................ F02C 7/24 |
| 2017/0342912 | A1 * | 11/2017 | Kim ................. F02C 9/26 |
| 2018/0163967 | A1 * | 6/2018 | Arellano ........... F23R 3/286 |

FOREIGN PATENT DOCUMENTS

| | | |
|---|---|---|
| WO | WO2011117533 A2 | 9/2011 |
| WO | WO2014/052221 A1 | 4/2014 |

OTHER PUBLICATIONS

U.S. Appl. No. 15/468,172, filed Mar. 24, 2017.

Bellucci et al., "Thermoacoustic Modeling of a Gas Turbine Combustor Equipped With Acoustic Dampers", ASME Turbo Expo 2004: Power for Land, Sea, and Air, Volume: 1, pp. 635-644, Jun. 14-17, 2004, Vienna, Austria.

Gaeta et al., "Design and Experimental Validation of a Model-Based Injection Pressure Controller in a Common Rail System for GDI Engine", 2011 American Control Conference on O'Farrell Street, pp. 5273-5278, Jun. 29-Jul. 1, 2011,San Francisco, CA, USA.

* cited by examiner

GAS TURBINE ENGINE FUEL MANIFOLD DAMPER AND METHOD OF DYNAMICS ATTENUATION

FIELD

The present subject matter relates generally to gas turbine engine fuel manifold assemblies. More particularly, the present subject matter relates to damping structures for gas turbine engine fuel manifold assemblies.

BACKGROUND

Gas turbine engines generally include combustion sections receiving fuel from a fuel manifold assembly coupled to a plurality of fuel nozzles. The fuel manifold assembly may experience high amplitude dynamics (e.g., pressure oscillations, vibrations, harmonics) under various engine operating conditions due to a flow or pressure of the fuel through the fuel manifold assembly, pressure oscillations from the combustion section, and/or dynamics such as vibrations, noise, or harmonics from the engine in general. For example, engine operating conditions may include those defined by a landing/take-off cycle (LTO) for aviation engines or similar ranges for industrial, marine, auxiliary power unit, turboprop or turboshaft configurations. Engine operating conditions may include a generally lower power ignition/start-up and idle operation, a generally higher power take-off and climb condition, and other power conditions in between, such as cruise and approach. As an engine operates across these and other various operating conditions, fuel pressure and flow through the fuel manifold assembly to the combustion section varies, which may result in one or more resonance conditions that may disrupt fuel flow to the combustion section and adversely affect engine operation, up to and including loss of combustion. Unmitigated fuel manifold assembly dynamics may also result in structural damage to the fuel manifold assembly.

Pressure oscillations generally occur in combustion sections of gas turbine engines resulting from the ignition of a fuel and air mixture within a combustion chamber. While nominal pressure oscillations are a byproduct of combustion, increased magnitudes of pressure oscillations may result from generally operating a combustion section at lean conditions, such as to reduce combustion emissions, or a coupling between unsteady heat release dynamics of the resulting flame/combustion, the overall acoustics of the combustion section, and transient fluid dynamics within the combustor. Pressure oscillations generally result in undesirable high-amplitude, self-sustaining pressure oscillations within the combustion section that may propagate to the fuel manifold assembly. These pressure oscillations may result in intense, single-frequency or multiple-frequency dominated acoustic waves that may propagate within the combustion section and to the fuel manifold assembly, thereby inducing vibrations in the fuel manifold assembly that may result in oscillations in a flow or pressure of fuel within the fuel manifold assembly. Oscillation of the fuel flow or pressure may propagate from the fuel manifold assembly to the fuel nozzles and aggravate pressure oscillations inside the combustion section. Low frequency acoustic waves, such as those that occur during engine startup and/or during a low power to idle operating condition, and/or higher frequency waves, which may occur at other operating conditions, may reduce operability margin of the engine, may increase external combustion noise, vibration, or harmonics, or induce loss of flame. Increased pressure oscillations may damage combustion sections or accelerate structural degradation of the combustion section, the fuel manifold assembly, or the engine in general, thereby resulting in engine failure or increased engine maintenance costs.

Therefore, there exists a need for a damping structure and method for fuel manifold assemblies to attenuate dynamics at the fuel manifold assembly that may mitigate losses in operability margin, increases in noise, vibration, or harmonics, or structural degradation of the fuel manifold, combustion section, or engine.

BRIEF DESCRIPTION

Aspects and advantages of the invention will be set forth in part in the following description, or may be obvious from the description, or may be learned through practice of the invention.

The present disclosure is directed to a fuel manifold assembly for a gas turbine engine. The fuel manifold assembly defines a walled conduit through which a fuel flows in a fuel passage. The walled conduit defines a first end and a second end opposite of the first end along a length of the walled conduit. The fuel manifold assembly includes an exit manifold to which a fuel nozzle attaches. The fuel manifold assembly includes a damper assembly coupled to the walled conduit of the fuel manifold assembly. The damper assembly includes a walled tube extended from the walled conduit. The damper assembly further includes a walled enclosure defining a damper cavity therein. The damper cavity is in fluid communication with a damper passage defined within the walled tube, and the damper passage is in fluid communication with the fuel passage.

In one embodiment, the fuel manifold assembly further includes a jumper tube coupled to the walled enclosure of the damper assembly. The jumper tube is coupled to the second end of the walled conduit, and the damper assembly is coupled to the first end of the walled conduit.

In another embodiment, the walled enclosure defines a generally cylindrical volume of the damper cavity.

In various embodiments, the fuel manifold assembly defines a first damper assembly disposed at the first end of the walled conduit and a second damper assembly disposed at the second end of the walled conduit. In one embodiment, the fuel manifold assembly further includes a connecting tube coupled to each of the walled enclosure of the first damper assembly and the second damper assembly. In another embodiment, the damper assembly defines a generally decreasing cross sectional area from the damper cavity to the walled tube. In still another embodiment, the damper assembly defines a generally decreasing cross sectional area from the damper cavity to the connecting tube. In still yet another embodiment, the connecting tube defines a cross sectional area less than the cross sectional area of the damper cavity of the damper assembly. In one embodiment, the walled enclosure of the damper assembly defines a bend at an acute angle of approximately 90 degrees or less. In another embodiment, the walled tube and/or the connecting tube defines a bend at an acute angle of approximately 90 degrees or greater.

In one embodiment, the damper assembly defines a cross sectional area at the walled tube less than the cross sectional area of the damper cavity.

In another embodiment, the fuel manifold assembly further includes a walled manifold extended from the connecting tube, in which the walled manifold defines a manifold cavity.

The present disclosure is further directed to a method for attenuating pressure oscillations at a fuel manifold assembly for a gas turbine engine. The method includes providing a damper cavity extended from a damper passage in fluid communication with a fuel passage of the fuel manifold assembly; providing a portion of fluid through the damper cavity from the fuel passage; and flowing a fuel through the fuel passage.

In one embodiment, the method further includes adjusting a flow or pressure of fuel through the fuel passage.

In another embodiment, providing a damper cavity includes disposing the damper cavity and damper passage at a first end of the fuel passage.

In various embodiments, the method further includes providing a second damper cavity and a second damper passage at a second end of the fuel passage opposite of the first end. In one embodiment, the method further includes providing fluid communication from the damper cavity to the second damper cavity via a connecting tube.

In one embodiment, the method further includes defining the damper cavity and the damper passage as a Helmholtz damper, in which a volume and/or area of the damper cavity and/or the damper passage is based at least in part on a target frequency of the fuel manifold during one or more engine operating conditions. In various embodiments, the method further includes providing fluid communication from a second end of the fuel passage to the damper cavity disposed at a first end of the fuel passage. In one embodiment, providing fluid communication from a second end of the fuel passage to the damper cavity at the first end of the fuel passage includes providing a counteracting pressure or flow at the damper cavity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
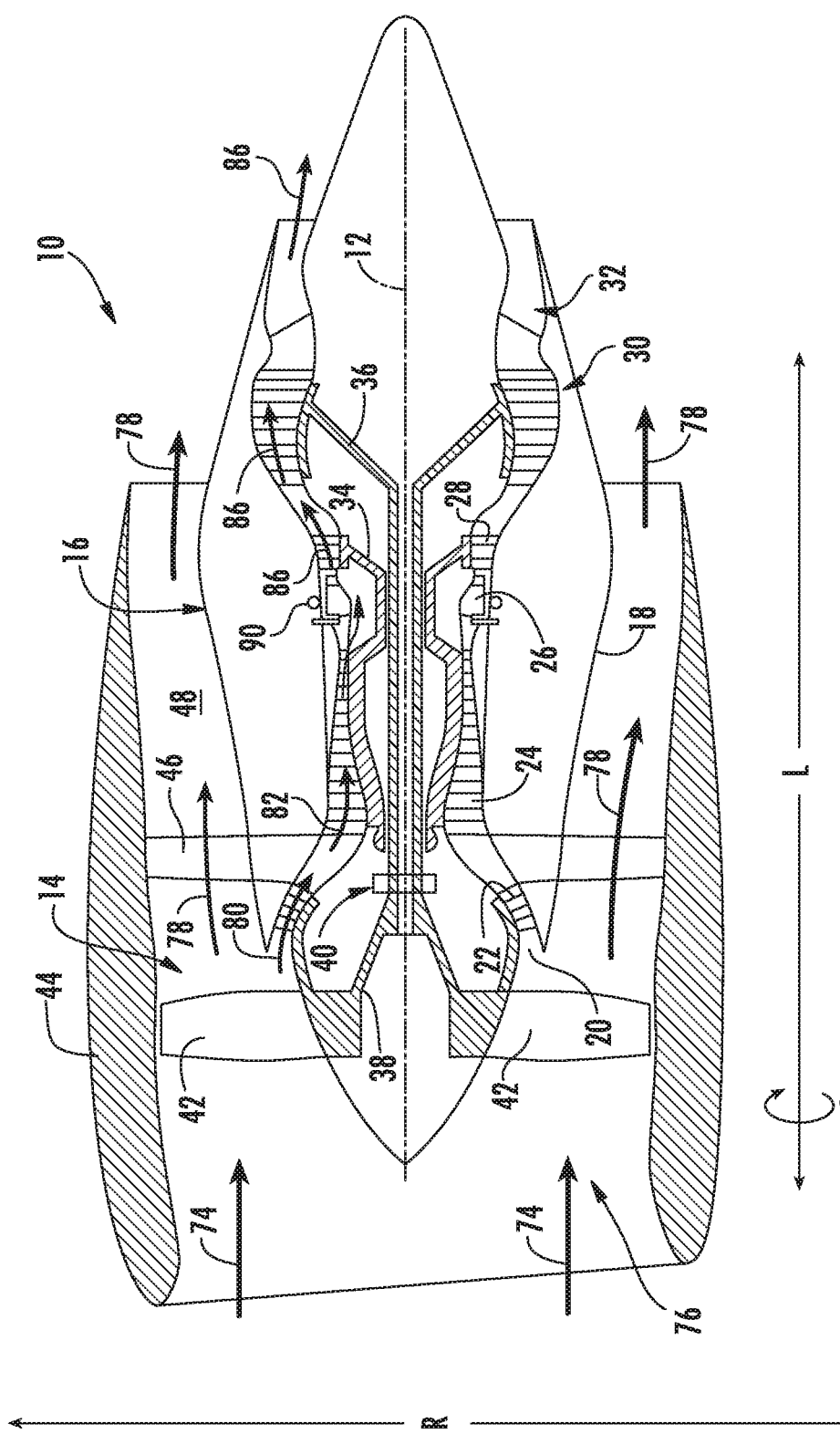
FIG. 1 is a schematic cross sectional view of an exemplary gas turbine engine incorporating an exemplary embodiment of a fuel manifold assembly and damper.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The terms "upstream of" or "downstream of" generally refer to directions toward "upstream 99" or toward "downstream 98", respectively, as provided in the figures.

A damper assembly coupled to a fuel manifold assembly is generally provided that may attenuate fuel manifold assembly dynamics across engine conditions. The damper assembly includes a walled tube defining a damper passage in fluid communication with a fuel passage of the fuel manifold assembly and a damper cavity defined by a walled enclosure of the damper assembly. The various embodiments of the damper assembly generally provided herein may attenuate dynamics (e.g., vibrations, noise, harmonics, etc.) as fluid flow and/or pressure changes across various engine conditions or as combustion dynamics change. Furthermore, the various embodiments provided herein may define a generally compact packaging enabling installation or implementation within generally restrictive confines of gas turbine engines, such as, but not limited to, aviation engines.

Referring now to the drawings, FIG. 1 is a schematic partially cross-sectioned side view of an exemplary high by-pass turbofan engine 10 herein referred to as "engine 10" as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes and generally along a longitudinal direction L. The engine 10 further defines a radial direction R extended from the axial centerline 12, and a circumferential direction C around the axial centerline 12. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

During operation of the engine 10, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. The now compressed air as indicated schematically by arrows 82 flows through the combustion section 26.

The engine 10 includes a fuel manifold assembly 90 generally surrounding the combustion section 26 that delivers a pressurized liquid or gaseous fuel to the combustion section 26. The fuel manifold assembly 90 is coupled to a plurality of fuel nozzles disposed through the combustion section 26 to deliver fuel into the engine 10 and mix with the compressed air 82 and ignited within the combustion section 26 to produce combustion gases as indicated schematically by arrows 86.

Referring still to FIG. 1, the combustion gases 86 generated in the combustion section 26 flow into the HP turbine 28, thus causing the HP rotor shaft 34 to rotate, thereby supporting operation of the HP compressor 24. The combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Figure 2:
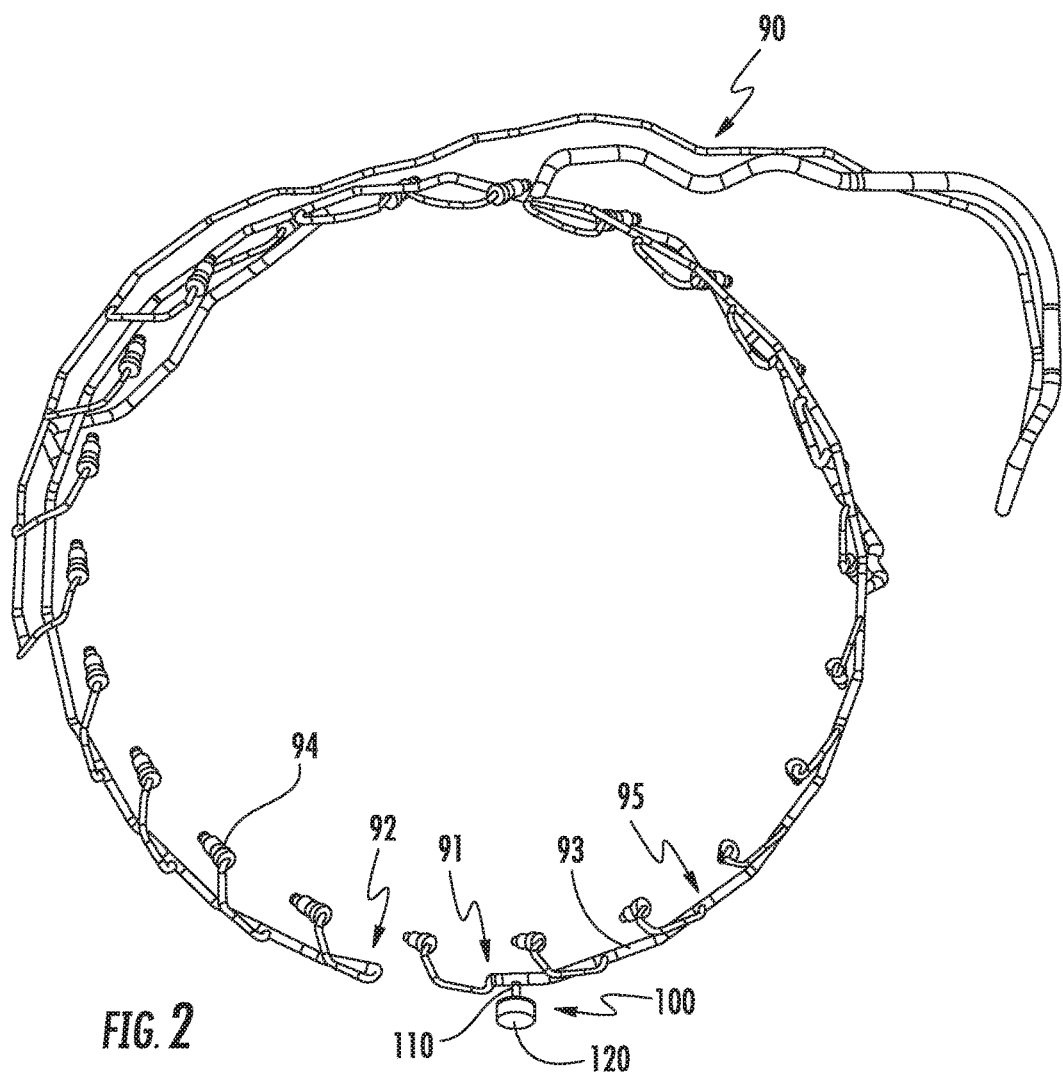
FIG. 2 is an exemplary embodiment of the fuel manifold assembly of the engine shown in FIG. 1.
Figure 3:
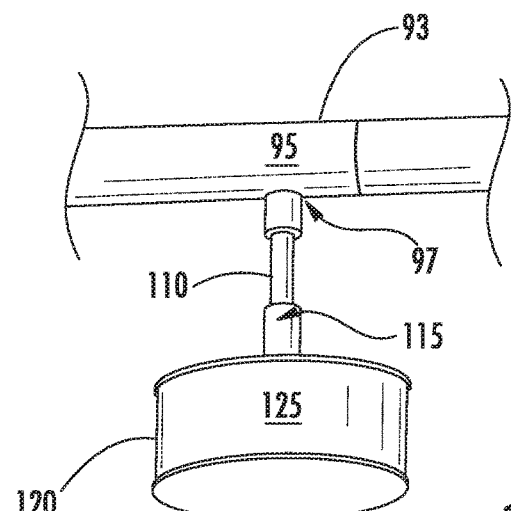
FIG. 3 is a schematic cross sectional view of a portion of the fuel manifold assembly including the damper assembly shown in FIG. 2.

Referring now to FIGS. 2-3, an exemplary embodiment of the fuel manifold assembly 90 shown on the engine 10 in FIG. 1 is generally provided. The fuel manifold assembly 90 defines a walled conduit 93 through which a fuel flows in a fuel passage 95. The walled conduit 93 defines a first end 91 and a second end 92 opposite of the first end 91 along a length of the walled conduit 93. The fuel manifold assembly 90 includes an exit manifold 94 to which a fuel nozzle of the combustion section 26 (shown in FIG. 1) attaches.

The fuel manifold assembly 90 includes a damper assembly 100 coupled to the walled conduit 93 of the fuel manifold assembly 90. The damper assembly 100 includes a walled tube 110 extended from the walled conduit 93. The damper assembly 100 further includes a walled enclosure 120 defining a damper cavity 125 within the walled enclosure 120. The damper cavity 125 is in fluid communication with a damper passage 115 defined within the walled tube 110. The damper passage 115 is in fluid communication with the fuel passage 95.

The damper assembly 100 coupled to the walled conduit 93 may reduce fuel manifold assembly 90 vibrations and harmonics due, at least in part, to pressure oscillations in the flow of fuel through the fuel passage 95 of the walled conduit 93. For example, acoustic waves arising generally from pressure oscillations in the flow of fuel in the fuel passage 95 may be damped in the damper passage 115 and/or the damper cavity 125 of the damper assembly 100. In various embodiments, high amplitude oscillations in the damper passage 115 dissipate pressure oscillations at an interface 97 of the walled tube 110 and the walled conduit 93, or otherwise, at an interface of the damper passage 115 and the fuel passage 95. As provided generally in FIG. 3, the interface 97 at the walled tube 110 and the walled conduit 93 may define a generally larger cross sectional area than at the walled tube 110 between the walled conduit 93 and the walled enclosure 120. Still further, in various embodiments, the walled enclosure 120 defining the damper cavity 125 may define a generally cylindrical volume of the damper cavity 125.

The damper passage 115 may be sized at least partially based on a length over diameter (L/D) related to a target frequency, or range thereof, for the damper cavity 125 and the damper assembly 100 to attenuate. For example, the damper passage 115 defines a length from the interface 97 of the walled tube 110 and the walled conduit 93. The diameter of the walled tube 110 and the length of the damper passage 115 are each defined, at least in part, by a target frequency, or range thereof, of pressure oscillations to attenuate within the damper cavity 125 of the acoustic damper 100.

In various embodiments the damper assembly 100 defines a Helmholtz damper in which the target frequency, or range thereof, of pressure oscillations of which damper assembly 100 may attenuate may be defined by the equation:

$$f = \frac{c}{2\pi}\sqrt{\left(\frac{A}{VL'}\right)}$$

where f is the frequency, or range thereof, of pressure oscillations to be attenuated; c is the velocity of sound in the fluid (i.e., air or combustion gases); A is the cross sectional area of the opening of the damper passage 115; V is the volume of the damper cavity 125; and L' is the effective length of the damper passage 115. In various embodiments, the effective length is the length of the damper passage 115 plus a correction factor generally understood in the art multiplied by the diameter of the area of the damper passage 115.

Figure 4:
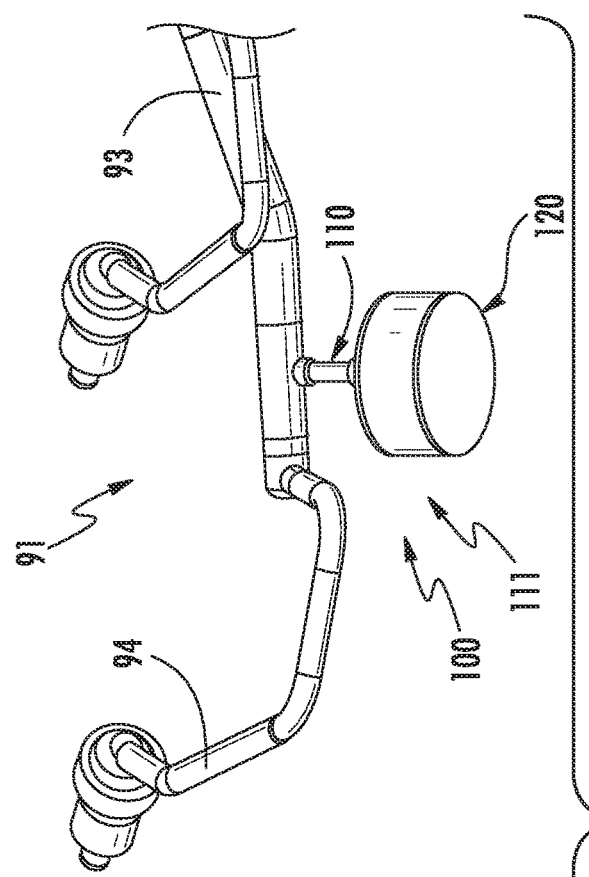
FIG. 4 is a detailed view of an exemplary embodiment of the fuel manifold assembly of the engine shown in FIG. 1.
Figure 4:
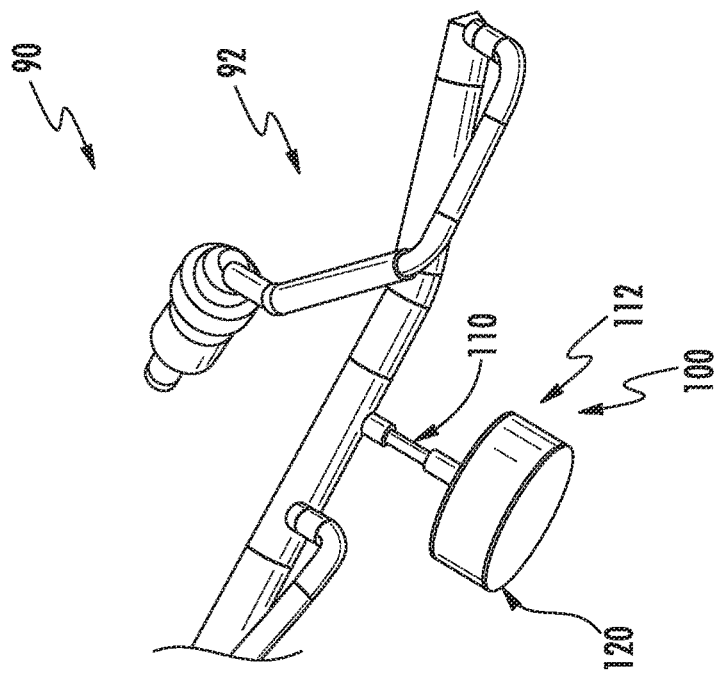

Referring now to FIG. 4, a detailed view of an exemplary embodiment of the fuel manifold assembly 90 including the damper assembly 100 is generally provided. The embodiment shown in FIG. 4 may be configured substantially similarly to the embodiment shown and described in regard to FIGS. 2-3. However, in FIG. 2, the damper assembly 100 is disposed at each of the first end 91 and the second end 92 of the walled conduit 93 of the fuel manifold assembly 90. The walled conduit 93 of the fuel manifold assembly 90 is generally extended approximately 360 degrees along the circumferential direction C around the engine 10 (shown in FIG. 1), in which the first end 91 and the second end 92 are detached and opposite along the circumferential distance of the walled conduit 93. In the embodiment generally provided in FIG. 3, a first damper assembly 111 is disposed at the first end 91 of the walled conduit 93 and a second damper assembly 112 is disposed at the second end 92 of the walled conduit 93. In various embodiments, the damper assembly 100 is disposed at a bottom half portion of the fuel manifold assembly 90, such as proximate to bottom dead center. In still various embodiments, each damper assembly 100 may define different areas or volumes of the damper passage 115 or damper cavity 125, or both, to target different or complimentary ranges of frequencies of pressure oscillations of fuel flow through the fuel passage 95 defined by the walled conduit 93.

Figure 5:
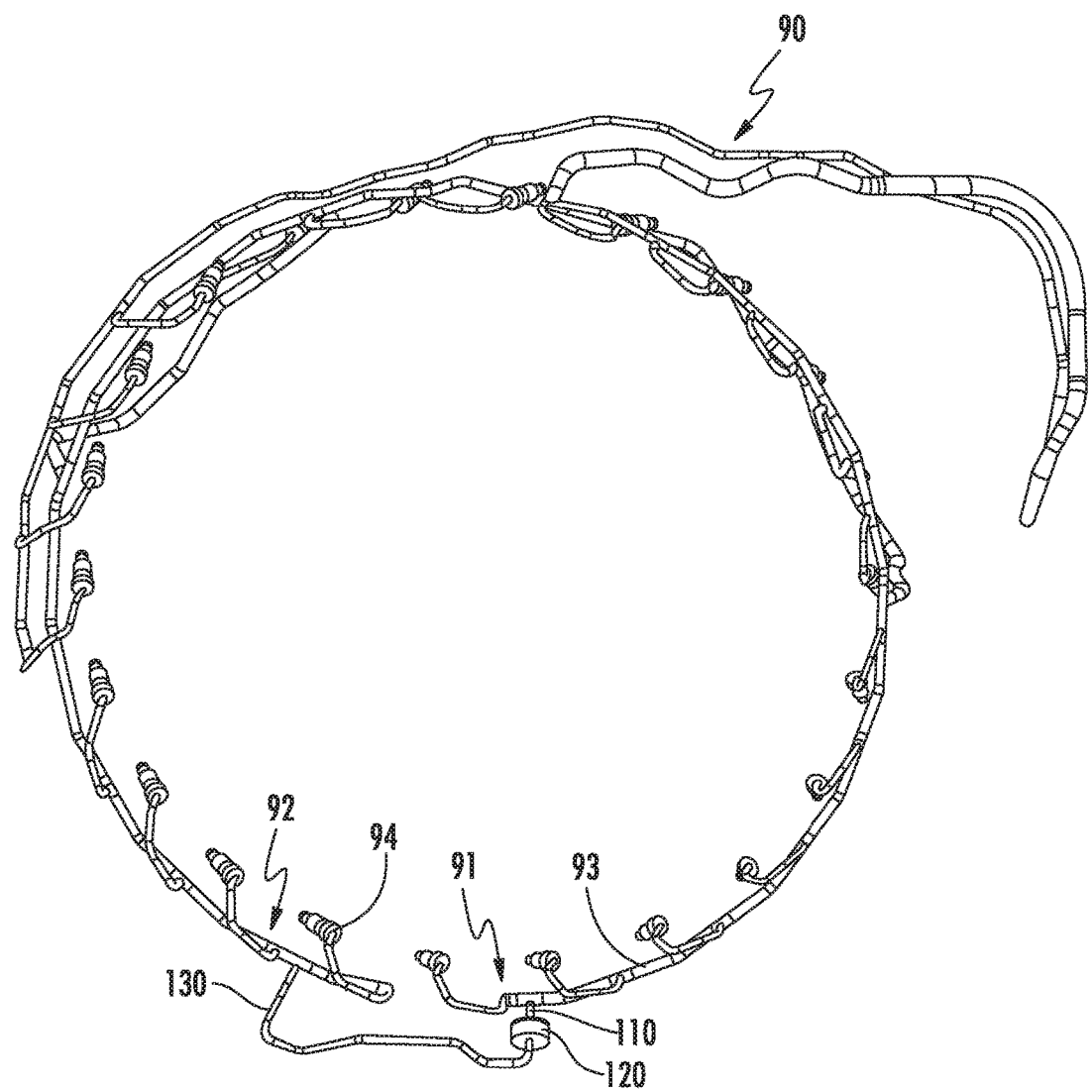
FIG. 5 is an exemplary embodiment of another fuel manifold assembly of the engine shown in FIG. 1.

Referring now to FIG. 5, another embodiment of the fuel manifold assembly 90 is generally provided and configured substantially similarly as the embodiments provided in regard to FIGS. 2-3. However, in FIG. 5 the fuel manifold assembly 90 further includes a jumper tube 130 coupled to the walled enclosure 120 of the damper assembly 100. In the embodiment shown in FIG. 5, the jumper tube 130 is coupled to the second end 92 of the walled conduit 93 and the damper assembly 100 is coupled to the first end 91. It should be appreciated that in other embodiments, the damper assembly 100 may be coupled to the second end 92 of the walled conduit 93 and the jumper tube 130 is coupled to the first end 91.

In various embodiments as provided in regard to FIG. 5, the jumper tube 130 provides fluid communication from the second end 92 of the walled conduit 93 to the damper assembly 100 coupled to the first end 91. The jumper tube 130 defines a generally hollow walled tube structure. The jumper tube 130 may attenuate dynamics (e.g., vibrations, harmonics, etc.) by reducing pressure oscillations in the flow of fuel in the fuel passage 95 in the fuel manifold assembly 90. For example, the jumper tube 130 coupled to the second end 92 of the fuel manifold assembly 90 may provide a counteracting pressure or flow at the jumper tube 130 and/or the walled enclosure 120 of the damper assembly 100 receiving a pressure or flow from the first end 91 of the walled conduit 93. As such, as pressure oscillations or target frequencies for attenuation change with engine operating conditions, such as fuel flows or pressure in the fuel passage 95 of the walled conduit 93, the jumper tube 130 coupled to the damper assembly 100 may generally provide a broad range of target frequency or pressure oscillations at which the damper assembly 100 attenuates.

Figure 6:
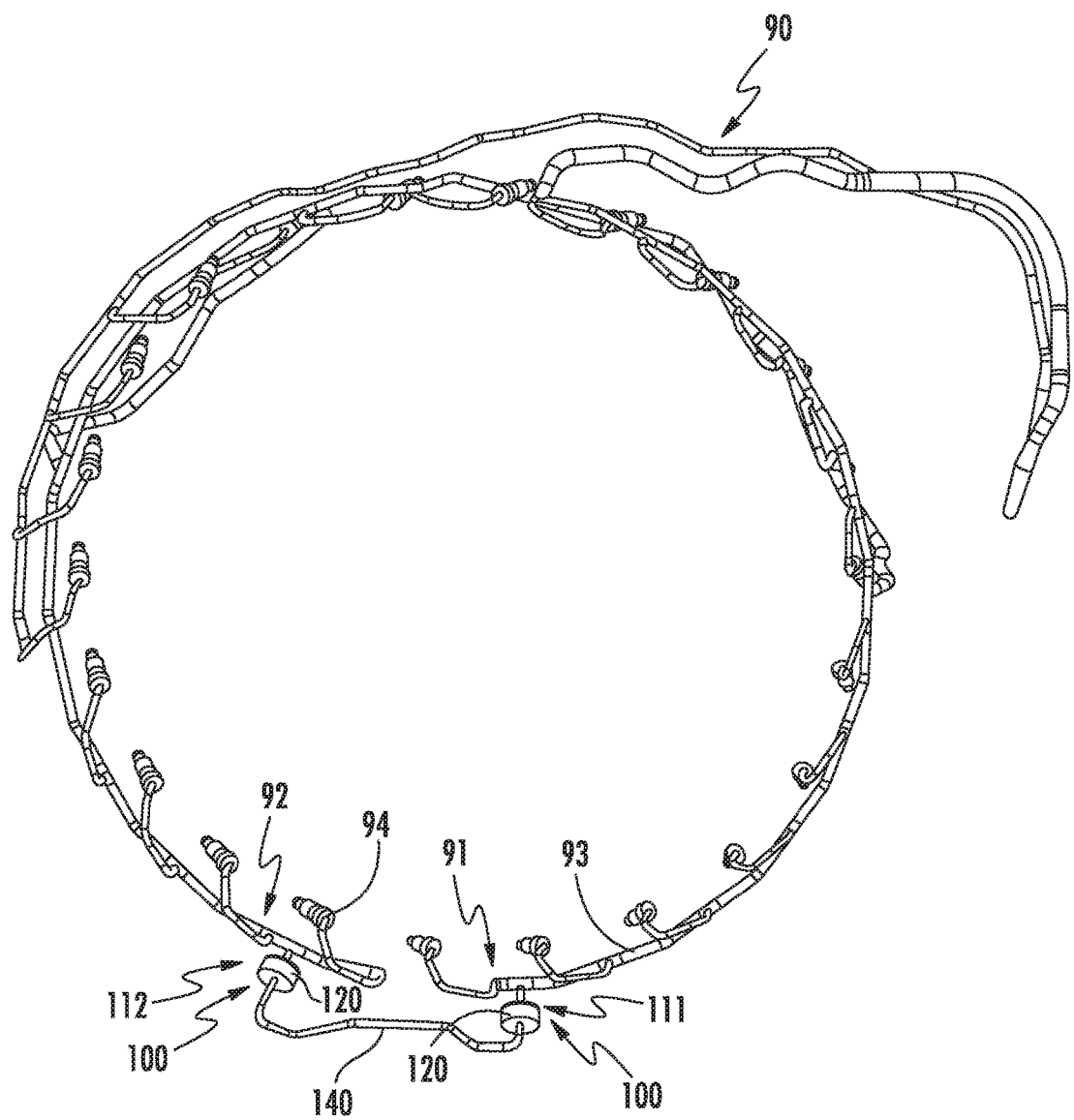
FIG. 6 is an exemplary embodiment of still another fuel manifold assembly of the engine shown in FIG. 1.

Referring now to FIG. 6, an embodiment of the fuel manifold assembly 90 is generally provided and configured substantially similarly as the embodiments provided in regard to FIGS. 2-5. However, in the embodiment provided in FIG. 5 the fuel manifold assembly 90 further includes a connecting tube 140 coupled to each of the walled enclosure 120 of the first damper assembly 111 and the second damper assembly 112. The first damper assembly 111 and the second damper assembly 112 are disposed on the walled conduit 93 substantially similarly as shown and described in regard to FIG. 4. The connecting tube 140 further provides fluid communication between the first damper assembly 111 and the second damper assembly 112 via a generally hollow walled tube structure of the connecting tube 140.

The connecting tube 140 coupled to the first damper assembly 111 and the second damper assembly 112 may generally provide a broad range of target frequency or pressure oscillations at which the first damper assembly 111 and the second damper assembly 112 each attenuate substantially similarly as described in regard to the jumper tube 130 generally provided in FIG. 5.

Figure 7:
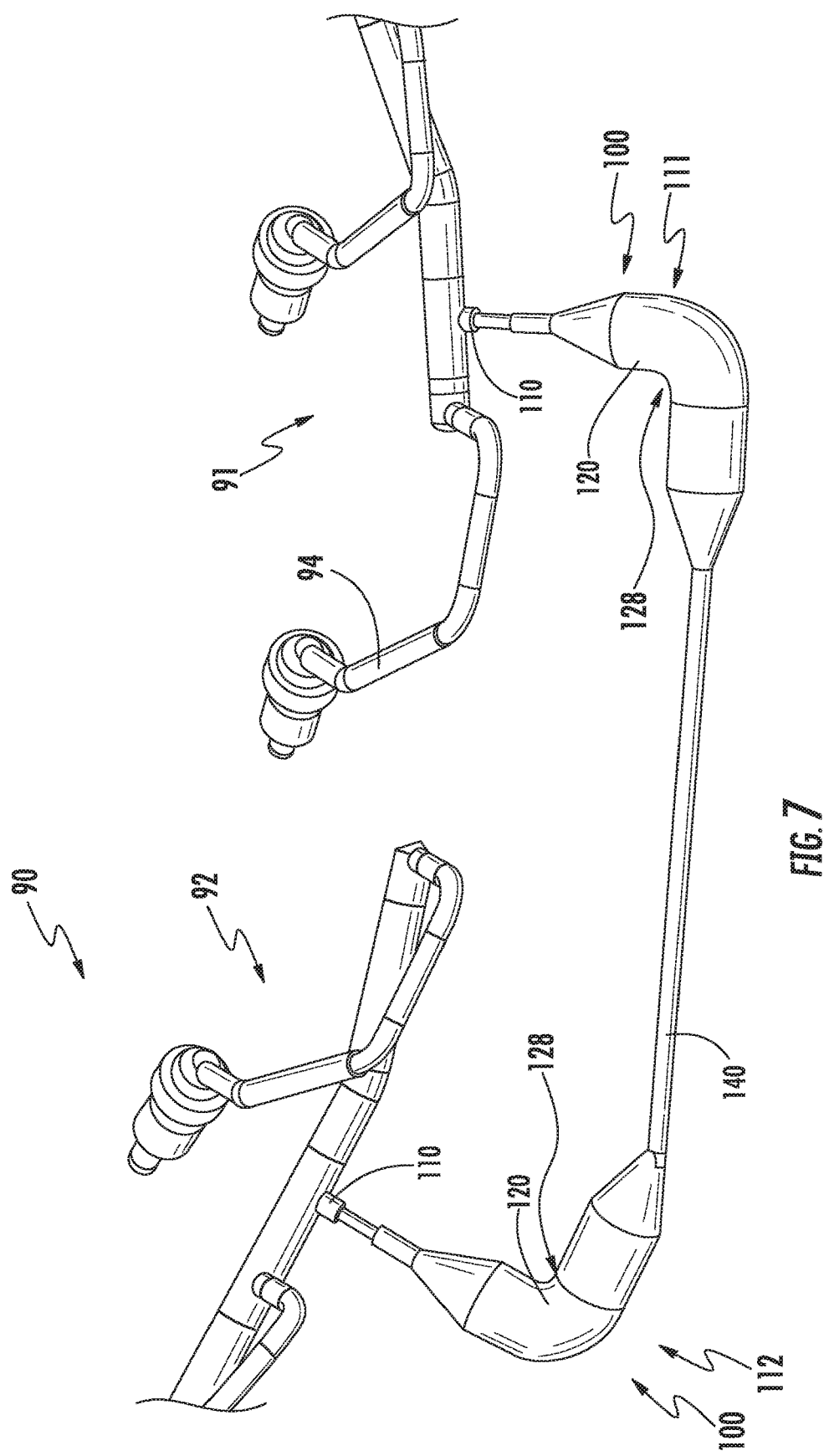
FIG. 7 is a detailed view of another exemplary embodiment of the fuel manifold assembly of the engine shown in FIG. 1.
Figure 8:
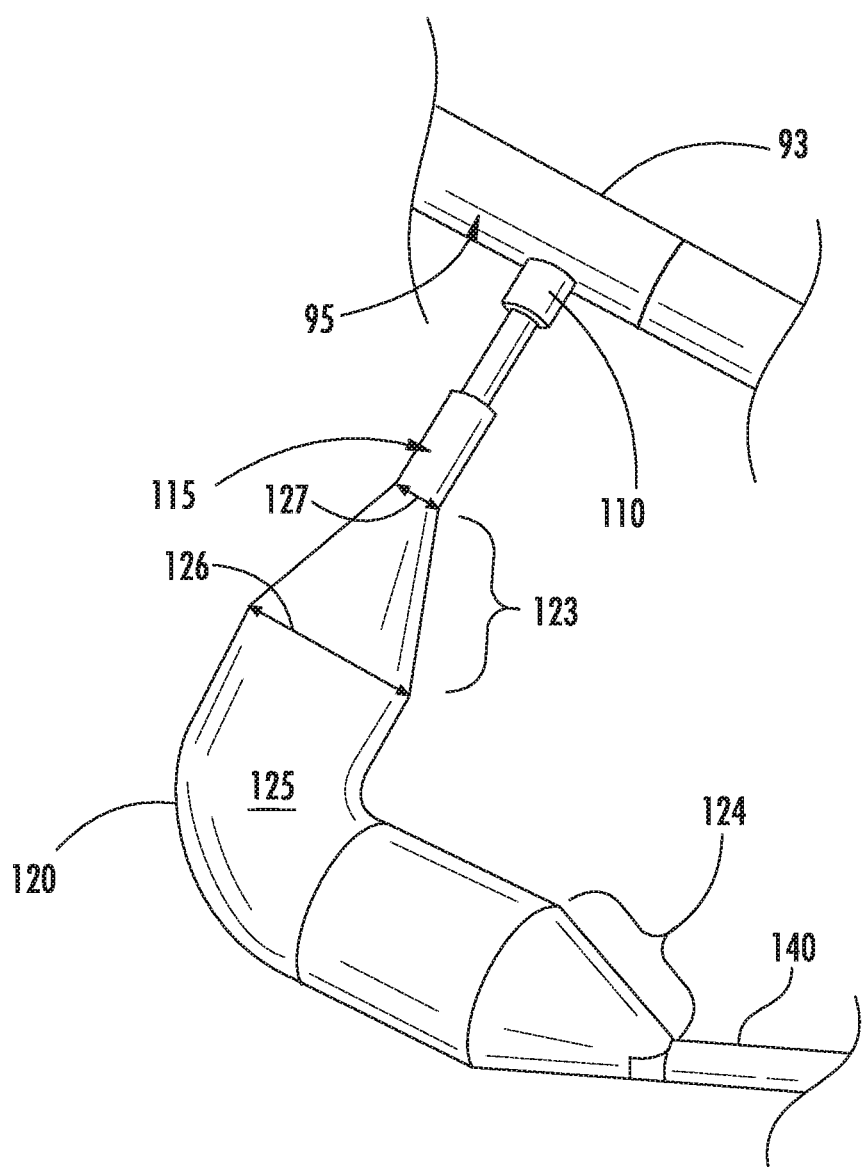
FIG. 8 is a schematic cross sectional view of a portion of the fuel manifold assembly including the damper assembly shown in FIG. 7.

Referring now to FIGS. 7-8, another embodiment of the fuel manifold assembly 90 is generally provided and configured substantially similarly as the embodiments provided in regard to FIGS. 2-6. However, in FIGS. 7-8, collectively, the damper assembly 100 of the fuel manifold assembly 90 defines a generally decreasing cross sectional area from the damper cavity 125 to the walled tube 110. For example, as shown in FIG. 8, the damper cavity 125 may define a maximum cross sectional area 126. As shown within area 123 of the walled enclosure 120, the damper cavity 125 may define a generally decreasing cross sectional area from the maximum cross sectional area 126 to a cross sectional area 127 at the walled tube 110. As such, in various embodiments, the damper assembly defines a cross sectional area at the walled tube 110 less than a cross sectional area of the damper cavity 125.

In one embodiment, the damper assembly 100 defines a generally decreasing cross sectional area from the damper cavity 125 to the connecting tube 140. For example, as shown within area 124 of the walled enclosure 120 as generally provided in FIG. 8, the damper cavity 125 may define a generally decreasing cross sectional area to the connecting tube 140. As such, the connecting tube 140 defines a cross sectional area less than the cross sectional area of the damper cavity 125.

Referring back to FIG. 7, in one embodiment, the walled enclosure 120 of the damper assembly 100 defines a bend 128 at an acute angle of approximately 90 degrees or less. The bend 128 at the walled enclosure 120 may define fluid and wall effect interactions that may dissipate acoustic energy from the pressure oscillations from the fuel passage 95. However, in other embodiments, the bend 128 may define an angle of approximately 90 degrees or greater.

Figure 9:
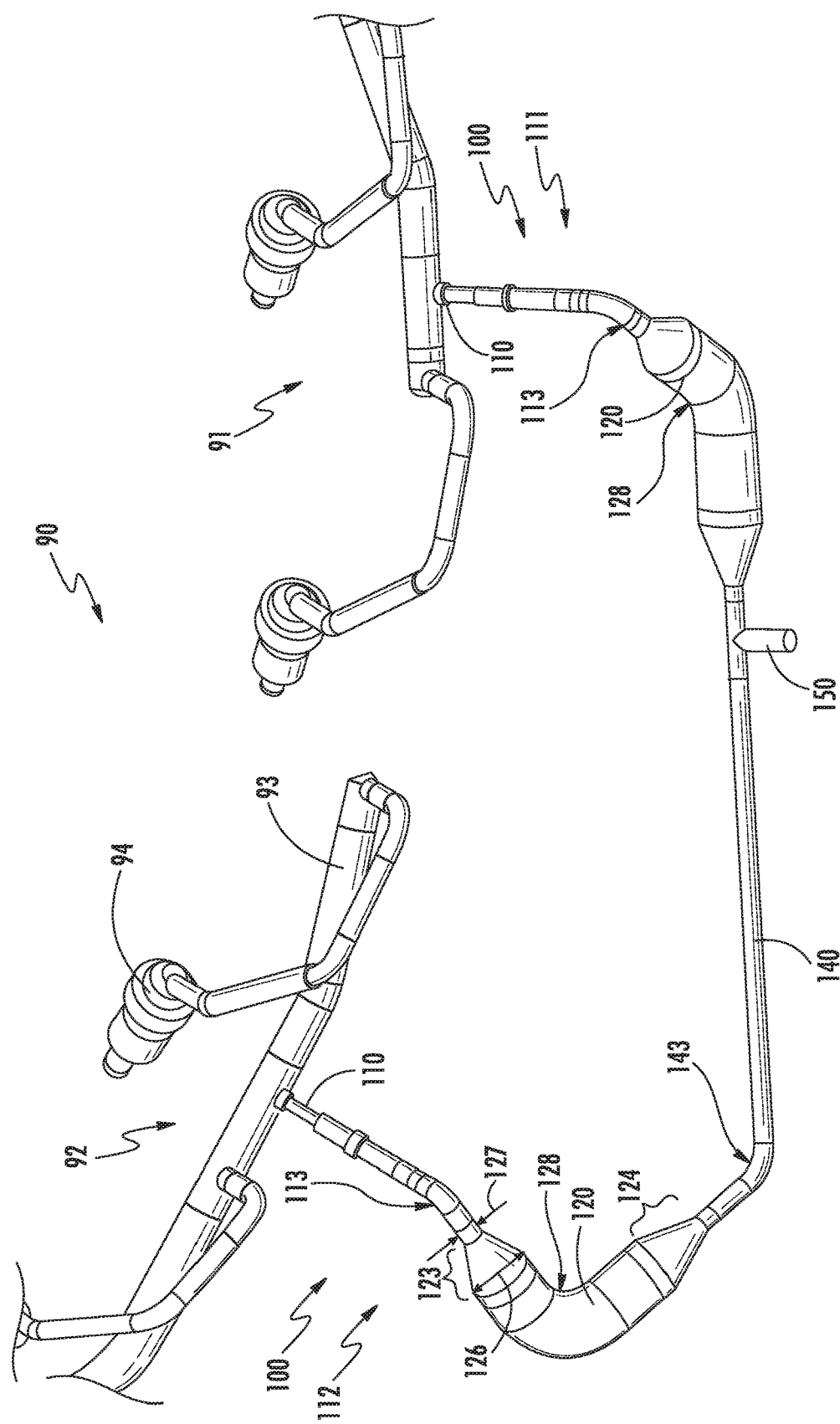
FIG. 9 is a detailed view of still another exemplary embodiment of the fuel manifold assembly of the engine shown in FIG. 1.

Referring now to FIG. 9, another embodiment of the fuel manifold assembly 90 is generally provided and configured substantially similarly as shown and described in regard to FIGS. 2-8. In the embodiment shown in FIG. 9, the damper assembly 100 further defines a bend 113 at the walled tube 110. In another embodiment, the damper assembly 100 further defines a bend 143 at the connecting tube 140. Similarly as described in regard to the bend 128 at the walled enclosure 120, the bends 113, 128, 143 may each enable further dissipation of acoustic energy from the pressure oscillations from the fluid in the fuel passage 95 while also enabling compact packaging of the damper assembly 100 within or around the engine 10.

In various embodiments, the bends 113, 143 may define an angle of approximately 90 degrees or greater. However, in other embodiments, the bends 113, 143 may define an acute angle of approximately 90 degrees or less. In still various embodiments, the bends 113, 143 may define an angle of approximately 90 degrees or greater while the bend 128 at the walled enclosure defines an acute angle of approximately 90 degrees or less. In still another embodiment, the bend 128 may define an angle of approximately 90 degrees or greater while the bends 113, 143 define an acute angle of approximately 90 degrees or less.

Referring still to FIG. 9, the damper assembly 100 may further include a walled manifold 150 extended from the connecting tube 140. The walled manifold defines a manifold cavity 155 within the walled manifold 150. In various embodiments, the walled manifold 150 may provide access to the connecting tube 140 through which instrumentation may be included, such as, but not limited to, pressure, temperature, or vibration sensors. For example, a dynamic pressure probe may ingress through the walled manifold 150 to read a pressure value at the manifold cavity 155 or the connecting tube 140. The dynamic pressure probe may provide measurements of fluid pressure (e.g., fuel pressure) changes, amplitudes, frequencies, spikes, etc. within the damper assembly 100 and fuel manifold assembly 90.

Figure 10:
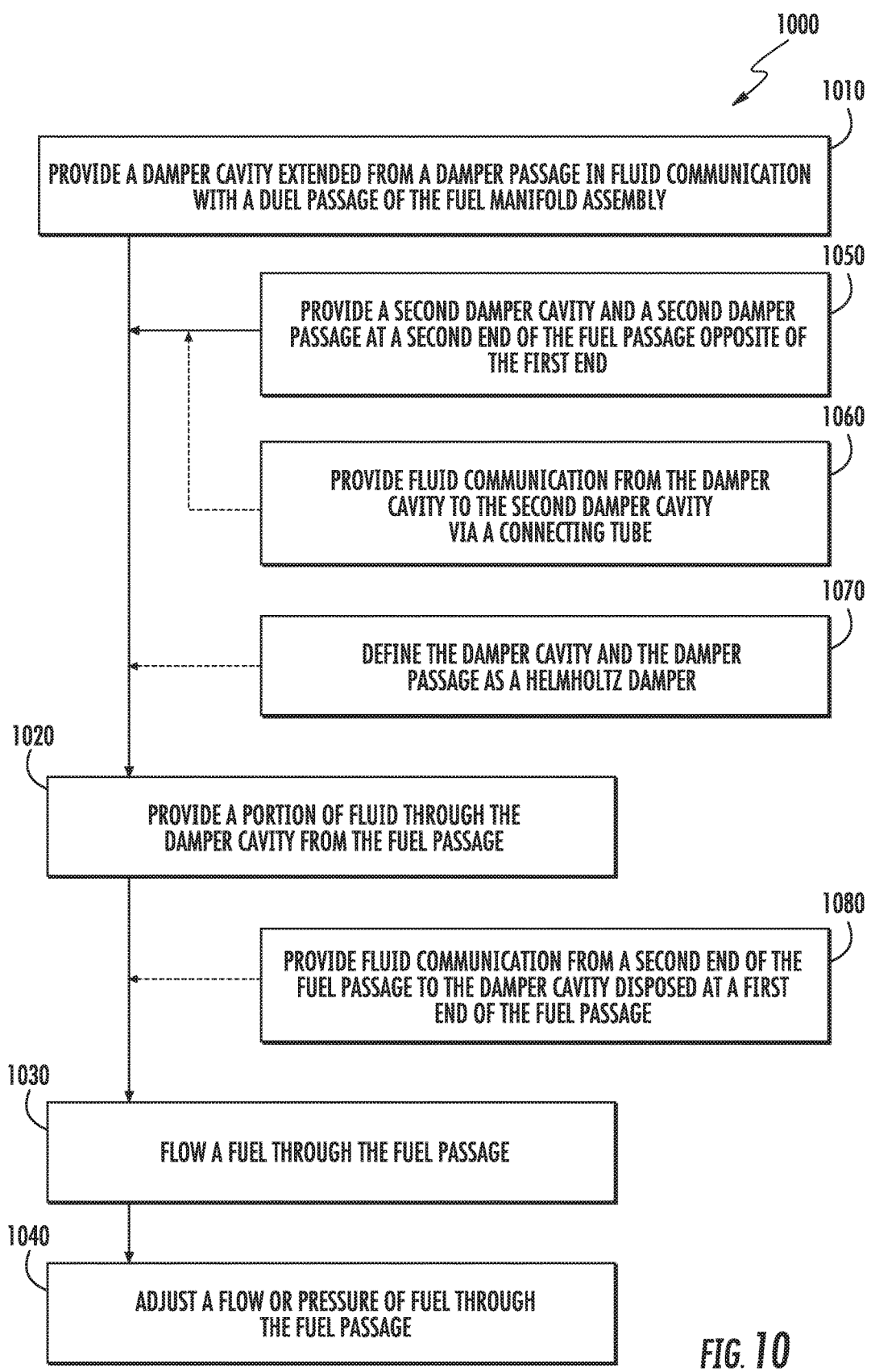
FIG. 10 is an exemplary flowchart outlining steps of a method of attenuating dynamics of a fuel manifold assembly for a gas turbine engine.

Referring now to FIG. 10, a flowchart outlining exemplary steps of a method of attenuating pressure oscillations in a fuel manifold is generally provided (herein referred to as "method 1000"). The method 1000 may define an assembly, structure, and/or operation of a fuel manifold assembly for a gas turbine engine, such as the fuel manifold assembly 90 of the engine 10 shown and described in regard to FIGS. 1-9. Although the steps provided herein are generally arranged in a serial order, it should be appreciated that one of ordinary skill in the art may rearrange, omit, combine, or otherwise substantially perform the steps provided herein in various combinations.

The method 1000 generally includes at 1010 providing a damper cavity extended from a damper passage in fluid communication with a fuel passage of the fuel manifold assembly; at 1020 providing a portion of fluid through the damper cavity from the fuel passage; and at 1030 flowing a fuel through the fuel passage (e.g., the damper cavity 125, the damper passage 115, and the fuel passage 95, each of fuel manifold assembly 90 and/or damper assembly 100 provided generally in regard to FIGS. 1-9.

In various embodiments, providing a portion of fluid at 1020 includes providing a liquid and/or gaseous fuel, air, or inert gas through the damper cavity from the fuel passage.

In one embodiment, the method 1000 further includes at 1040 adjusting a flow or pressure of fuel through the fuel passage. Adjusting a flow or pressure of fuel through the fuel passage may generally correspond to adjusting or changing engine operating conditions (e.g., ignition/startup, ramp up and turndown to take-off or maximum power, or various operating powers or conditions therebetween).

In various embodiments, the step at 1010 may include disposing the damper cavity (e.g., damper cavity 125) and the damper passage (e.g., damper passage 115) at a first end of the fuel passage (e.g., first end 91 of the fuel passage 95). In one embodiment, the method 1000 further includes at 1050 providing a second damper cavity and a second damper passage at a second end of the fuel passage opposite of the first end (e.g., damper cavity 125 and damper passage 115 at the second damper assembly 112 at the second end 92 of the fuel passage 95).

For example, the fuel passage may generally define an approximately circumferential conduit or channel disposed around the engine to deliver fuel to a plurality of fuel nozzles generally disposed in circumferential arrangement around an axial centerline of the engine. The fuel passage may generally extend from approximately zero degrees to approximately 360 degrees without coupling the fuel passage in a closed loop. As such, the first end may define an end opposite of a second end (e.g., the first end is approximately zero degrees and the second end is approximately 360 degrees).

In another embodiment, the method 1000 further includes at 1060 providing fluid communication from the damper cavity to the second damper cavity via a connecting tube. For example, providing fluid communication from the damper cavity to the second damper cavity via a connecting tube (e.g., connecting tube 140). Providing fluid communication from the damper cavity to the second damper cavity via the connecting tube may generally define a closed loop of fluid communication through the fuel passage 95, the first damper assembly 111, the second damper assembly 112, and the connecting tube 140. In one embodiment, providing fluid communication from the second damper cavity at the second end of the fuel passage to the damper cavity at the first end of the fuel passage includes providing a counteracting pressure or flow at the damper cavity, such as described in regard to FIGS. 5-6.

In still various embodiments, the method 1000 further includes at 1070 defining the damper cavity and the damper passage as a Helmholtz damper. For example, defining the damper cavity 125 and the damper passage 115 as a Helmholtz damper may include defining a volume and/or area of the damper cavity 125 and/or the damper passage 115 is based at least in part on a target frequency of the fuel manifold assembly 90 during one or more engine 10 operating conditions.

In one embodiment, the method 1000 may further include at 1080 providing fluid communication from a second end of the fuel passage to the damper cavity disposed at a first end of the fuel passage, such as shown and described generally in regard to the embodiment in FIG. 5. In one embodiment, providing fluid communication from a second end of the fuel passage to the damper cavity at the first end of the fuel passage includes providing a counteracting pressure or flow at the damper cavity, such as described in regard to FIGS. 5-6.

All or part of the fuel manifold assembly 90 and/or damper assembly 100 may be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct the damper assembly 100 separately or integral to one or more other portions of the fuel manifold assembly 90. Furthermore, the fuel manifold assembly 90 including the damper assembly 100 may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include high-strength steels, nickel and cobalt-based alloys, and/or metal or ceramic matrix composites, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel manifold assembly for a gas turbine engine, the fuel manifold assembly defining a walled conduit through which a fuel flows in a fuel passage, the walled conduit defining a first end and a second end opposite of the first end along a length of the walled conduit, wherein the fuel manifold assembly includes an exit manifold to which a fuel nozzle attaches, the fuel manifold assembly comprising:
 a damper assembly coupled to the walled conduit of the fuel manifold assembly, the damper assembly comprising a walled tube extended from the walled conduit, and wherein the damper assembly comprises a walled enclosure defining a damper cavity therein, wherein the damper cavity is in fluid communication with a damper passage defined within the walled tube, and wherein the damper passage is in fluid communication with the fuel passage, and
 a jumper tube connected to and extending from the walled enclosure of the damper assembly, wherein the jumper tube is further connected to and extends to the second end of the walled conduit, and wherein the damper assembly is coupled to the first end of the walled conduit.

2. The fuel manifold assembly of claim 1, wherein the walled enclosure defines a generally cylindrical volume of the damper cavity.

3. The fuel manifold assembly of claim 1, wherein the damper assembly defines a cross sectional area at the walled tube less than a cross sectional area of the damper cavity.

4. A fuel manifold assembly for a gas turbine engine, the fuel manifold assembly defining a walled conduit through which a fuel flows in a fuel passage, the walled conduit defining a first end and a second end opposite of the first end along a length of the walled conduit, wherein the fuel manifold assembly includes an exit manifold to which a fuel nozzle attaches, the fuel manifold assembly comprising:
 a first damper assembly coupled to the first end of the walled conduit of the fuel manifold assembly, wherein the first damper assembly comprises a first walled tube extended from the first end of the walled conduit, and wherein the first damper assembly further comprises a first walled enclosure defining a first damper cavity therein, wherein the first damper cavity is in fluid communication with a first damper passage defined within the first walled tube, and wherein the first damper passage is in fluid communication with the fuel passage, and
 a second damper assembly coupled to the second end of the walled conduit of the fuel manifold assembly, wherein the second damper assembly comprises a second walled tube extended from the second end of the walled conduit, and wherein the second damper assembly further comprises a second walled enclosure defining a second damper cavity therein, wherein the second damper cavity is in fluid communication with a second damper passage defined within the second walled tube, and wherein the second damper passage is in fluid communication with the fuel passage, and
 a connecting tube connected to and extending from the first walled enclosure of the first damper assembly and connected to and extending to the second walled enclosure of the second damper assembly.

5. The fuel manifold assembly of claim 4, wherein the first damper assembly defines a decreasing cross sectional area from the first damper cavity to the first walled tube, and
 the second damper assembly defines a decreasing cross sectional area from the second damper cavity to the second walled tube.

6. The fuel manifold assembly of claim 4, wherein the first damper assembly defines a decreasing cross sectional area from the first damper cavity to the connecting tube, and
 the second damper assembly defines a decreasing cross sectional area from the second damper cavity to the connecting tube.

7. The fuel manifold assembly of claim 4, wherein the connecting tube defines a cross sectional area less than a cross sectional area of the first damper cavity of the first damper assembly, and/or
 the connecting tube defines a cross sectional area less than a cross sectional area of the second damper cavity of the second damper assembly.

8. The fuel manifold assembly of claim 4, wherein the first walled enclosure of the first damper assembly defines a bend at an angle of 90 degrees or less, and/or
 the second walled enclosure of the second damper assembly defines a bend at an angle of 90 degrees or less.

9. The fuel manifold assembly of claim 4, wherein the first walled tube, the second walled tube, and/or the connecting tube defines a bend at an angle of 90 degrees or greater.

10. The fuel manifold assembly of claim 4, wherein the fuel manifold assembly further comprises:
 a walled manifold extended from the connecting tube, wherein the walled manifold defines a manifold cavity.

11. A method for attenuating pressure oscillations at a fuel manifold assembly for a gas turbine engine, the method comprising:
 providing the fuel manifold assembly comprising:
  a walled conduit through which a fuel flows in a fuel passage, the walled conduit defining a first end and a second end opposite of the first end along a length of the walled conduit, wherein the fuel manifold assembly includes an exit manifold to which a fuel nozzle attaches, the fuel manifold assembly comprising:
  a damper assembly coupled to the walled conduit of the fuel manifold assembly, the damper assembly comprising a walled tube extended from the walled conduit, and wherein the damper assembly comprises a walled enclosure defining a damper cavity therein, wherein the damper cavity is in fluid communication with a damper passage defined within the walled tube, and wherein the damper passage is in fluid communication with the fuel passage, and
  a jumper tube connected to and extending from the walled enclosure of the damper assembly, wherein the jumper tube is further connected to and extends to the second end of the walled conduit, and wherein the damper assembly is coupled to the first end of the walled conduit;
 providing a portion of fluid through the damper cavity from the fuel passage; and
 flowing a fuel through the fuel passage.

12. The method of claim 11, the method further comprising:
 adjusting a flow or pressure of fuel through the fuel passage.

13. The method of claim 11, the method further comprising:

defining the damper cavity and the damper passage as a Helmholtz damper, wherein a volume and/or area of the damper cavity and/or the damper passage is based at least in part on a target frequency of the fuel manifold during one or more engine operating conditions.

14. The method of claim 11, the method further comprising:
providing fluid communication from the second end of the fuel passage to the damper cavity disposed at the first end of the fuel passage.

15. The method of claim 14, wherein providing fluid communication from the second end of the fuel passage to the damper cavity at the first end of the fuel passage includes providing a counteracting pressure or flow at the damper cavity.

* * * * *